(12) United States Patent
Cookman et al.

(10) Patent No.: US 6,327,249 B1
(45) Date of Patent: Dec. 4, 2001

(54) DATA COMMUNICATION DEVICE

(75) Inventors: Jordan C. Cookman, Fremont; Ping Dong, Cupertino, both of CA (US)

(73) Assignee: ESS Technology, INC, Fremont, CA (US)

( * ) Notice: Subject to any disclaimer, the term of this patent is extended or adjusted under 35 U.S.C. 154(b) by 0 days.

(21) Appl. No.: 09/369,034

(22) Filed: Aug. 4, 1999

(51) Int. Cl.[7] .................................. H04J 1/16; H04J 3/14
(52) U.S. Cl. ..................... 370/235; 370/428; 370/463; 375/220
(58) Field of Search ..................... 370/235, 412, 370/428, 463, 429, 230, 232, 233, 234, 252, 401; 709/232, 235, 214, 213, 215, 224, 249, 250; 375/220, 222

(56) References Cited

U.S. PATENT DOCUMENTS

| | | | |
|---|---|---|---|
| 5,155,760 | * 10/1992 | Johnson et al. | 379/67 |
| 5,663,948 | * 9/1997 | Kobunaya | 370/229 |
| 5,721,830 | 2/1998 | Yeh et al. | 395/200.67 |
| 5,781,533 | * 7/1998 | Manning et al. | 370/236 |
| 5,802,153 | * 9/1998 | Sridhar et al. | 379/93 |
| 5,920,570 | * 7/1999 | Gebhardt | 370/429 |
| 6,108,720 | * 8/2000 | Tal et al. | 710/20 |

* cited by examiner

Primary Examiner—Ricky Ngo

(74) Attorney, Agent, or Firm—Stevens & Westberg LLP (57) ABSTRACT

A device for use in a modem configuration that enables the transfer of data from a host signal processor (HSP) to an A/D-D/A converter or CODEC with less data loss, with low noise and that can send data at varying carrier frequencies without changing the size of the buffers. The device further allows for data transfer that is flexible with any given modulation scheme, carrier frequency or baud frequency to conform with the V.34, V90, as well as prior and subsequent recommendations. The device further includes a counter for counting the number of data samples transferred between the CODEC and the HSP and for alerting the HSP to avoid an overflow condition. The counter is further configured to count beyond the physical size of the buffer in order to simplify operation in an overflow condition. A transmit buffer is included for transferring data from the HSP to the CODEC. Communicating with the HSP and the CODEC is another counter that, similar to the first counter, counts the data sent from the HSP to the CODEC. A threshold is established to activate a null signal generator connected to the output of the transmit buffer by a switch to send a null signal to the CODEC when there is no data in the transmit buffer to help maintain the communication link between the CODEC and the data transfer system at lower power. Once data is again available in the transmit buffer, the switch resumes communication between the transmit buffer and the CODEC. Furthermore, the transmit buffer is synchronized with the receive buffer to allow seamless echo cancellation procedures to be performed by the HSP. The echo cancellation performed by the HSP can now be consistent both during normal operation as well as while the receive buffer is in an overflow condition.

2 Claims, 7 Drawing Sheets

DATA COMMUNICATION DEVICE

BACKGROUND

The invention relates to host signal processing communications and, more particularly, to a data communication device configured to enable the processing of real-time signals in a non-real-time environment while maintaining quality and integrity throughout the signal transmission.

Conventional computer systems transmit data using modems connected to telephone lines or other communication media. These modems typically include an analog to digital converter and a digital to analog converter, (A/D-D/A converter) typically combined into a single device called a CODEC. This CODEC converts incoming analog signals to digital signals that can be processed by a signal processing unit and converts digital signals from a signal processing unit to outgoing analog signals that can be transmitted on a communication medium such as a telephone line. The signal processing unit, sometimes referred to as a "datapump," is conventionally a dedicated chip known as a Digital Signal Processor (DSP), which is preprogrammed with algorithms for converting the digital signals into information bits.

The modem may also include a second dedicated chip, sometimes called the "controller," which is a microcontroller preprogrammed to control the DSP and convert the information bits into data usable by the computer system. The controller may implement certain schemes to correct errors in the information bits, and may also implement certain schemes to compress the information bits for more efficient transmission. Some modems eliminate the dedicated controller chip by performing the control functions on the host computer system. These modems are commonly referred to as "controllerless modems."

Conventional modems may also include buffers to temporarily store information bits or data, since the computer system may not be able to respond immediately when data is available. More recently, Host Signal Processors (HSPs) have reduced the conventional modem hardware to a buffer circuit and a CODEC that are controlled by the HSP. Now, HSP processes running on the computer system perform the signal processing and the control functions of the modem, eliminating the need for either a dedicated DSP chip or a dedicated microcontroller chip. Since the HSP processes are running in a non-real-time environment, they are not able to respond at the sampling rate of the CODEC, a real-time device. Therefore, a dedicated circuit is needed to buffer the samples, allowing the HSP to transfer samples less frequently. The modern modem now consists of a HSP, control and signal processing software, a CODEC, and a dedicated circuit for buffering samples and interfacing the computer system hardware to the CODEC. The biggest challenge for these modem systems is to maintain the integrity of the incoming and outgoing data and consistency of the data transmission between the real-time data transmission system and the non-real-time data processing system. Data being transferred between the real-time part of the system and the non-real time part of the system of an HSP modem application consists of samples of an analog waveform that represent signals being transmitted and received on the communications medium. During modem communications, the CODEC outputs a constant flow of transmit samples, and requires as input a constant flow of receive samples. The HSP is powerful enough to process all the samples, but does not operate in real-time, so cannot process them at a consistent rate. Hence, the buffer system serves to maintain a constant flow of data between the host processor and the CODEC.

In a communication system where two or more entities transmit information on the same medium, a protocol must be established to separate the signals in order to avoid contention. One such protocol is time division multiplexing (TDM), where each entity takes turns transmitting on the medium. Another protocol is frequency division multiplexing (FDM), where each side uses a different frequency band of the common medium. Modern modems use echo cancellation, where both entities use the same medium and separate the signals traveling in opposite directions by subtracting the echo of the transmit signal from the receive signal. The echo is caused by the impedance mismatches in the network and its characteristics remain relatively constant throughout a transmission. For echo cancellation to work, an HSP must receive a consistent delay between the transmit signal and the received echo, so that the echo can be consistently subtracted from the received signal. If the delay ever changes, due to a poorly designed buffer scheme for example, the echo cancellation scheme will not be able to track the transmit echo properly, and data will be lost. Where digital signal processors (DSP's) once performed the echo cancellation, now the HSPs perform that function using the buffer system as a conduit.

Modem modulation schemes are typically defined in terms of analog signals. Most modulation schemes operate by altering the characteristics of a sine wave, the frequency of which is referred to as the carrier frequency. For example, Quadrature Amplitude Modulation (QAM) operates by altering the amplitude and phase of a carrier frequency at a fixed rate. This fixed rate is known as the baud frequency or symbol frequency. Since most modern modems use digital signal processing techniques, these analog signals must be converted to digital form using a sampling rate which is often a multiple of the baud frequency. Thus, an integer number of samples can be thought of as representing a "baud" or "symbol." Depending on the modulation scheme and the sophistication of the algorithms it uses, the symbols, either individually or in groups, represent a certain number of information bits. The average number of information bits transmitted per second is commonly called the "data rate" or "bit rate."

Standard protocols for modem modulation schemes have been developed to improve compatibility in the telecommunications industry. The International Telecommunications Union (ITU), formerly the International Telegraph and Telephone Consultative Committee (CCITT), for example, has developed standard recommendations that evolve with the changing technology in the modem industry. Earlier recommendations such as V.21, V.22 and V.23 use FDM for duplex communication. Newer recommendations such as V.32bis, V.34 and V.90 use echo cancellation for duplex communication. Other recommendations describe half-duplex modulation schemes for facsimile applications. Examples of these are V.27, V.29, and V.17. In employing any of these standards, it is important that a modem maintain a constant communication link with the data transmission system in order to maintain the integrity of the data transmission to be compliant.

One conventional HSP modem relies on a buffer solution that partitions a circular transmission buffer into frames based on the number of samples needed to represent an integral number of symbol periods and an integral number of carrier periods. In the conventional device, samples representing groups of symbols are transferred into a buffer. Such a modem is described and illustrated in U.S. Pat. No. 5,721,830, of Yeh, et al., assigned to PC-Tel, Inc. (the "'830 patent"). In this HSP modem, each buffer is partitioned into sections equal to the size of the individual groups of samples to be transmitted and received. Frame by frame, the samples are transferred in and out of the separate buffers to the host processor using a communications bus, such as Industry Standard Architecture (ISA) or Peripheral Component Interface (PCI). This bus is shared with other peripherals in the host computer system.

In operation of this prior art system, the CODEC continuously writes samples into the receive buffer and reads samples from the transmit buffer in a circular fashion. When one receive frame is full, the HSP must process it while the other frame is being filled by the CODEC. Similarly, while one frame is being transmitted, the other frame must be loaded with new samples by the HSP. In the event that the HSP is unable to process a frame, an overflow condition occurs. In this case, an entire frame of receive samples is lost, and is overwritten by the CODEC. Also, instead of sending new transmit samples, an old frame of samples is sent. In order to compensate for this condition, extensive circuitry is needed in the interface to account for the number of frames of samples lost. Also, extensive logic is needed in the HSP to account for lost samples in the echo cancellation process, which must be implemented so that the echo cancellation scheme can have consistent delay. As discussed above, in order for the echo cancellation to work, the echo received by the HSP must have consistent delay so that its value can be uniformly subtracted, giving the HSP the correct receive signal.

The operation of such a modem is further complicated by the implementation of the V.34 standard. In half-duplex modulation schemes and older duplex modulation schemes that employ the same carrier frequency for both transmit and receive, it is easy to make both the transmit and receive buffer sizes a multiple of the carrier period and symbol period. However, V.34 supports several combinations of carrier frequencies and symbol rates for signals traveling in both directions. Depending on line conditions, a different carrier may be used in one direction than in another. The sampling rate of the A/D and D/A in the CODEC, however, is usually the same. Therefore, the data, again samples of the analog waveform, are being transmitted between the CODEC and the host at the same frequency rate for both transmit and receive. In the '830 patent, the size of the buffers are based on an integral multiple of the carrier period and the symbol period. Since the samples are being transmitted and received at the same rate, it may be difficult to make the buffer size an integral multiple of both the transmit carrier frequency and the receive carrier frequency. This HSP modem would require many buffer sizes based on which combination of modulation scheme, carrier frequency and baud frequency is being used. For flexible application of this configuration, one would need to be able to change sizes or include several different buffers to accommodate different modulation schemes. This would be impractical in most applications.

This prior art HSP modem further includes an interrupt circuit sending an interrupt signal from the receive buffer to the processor each time a frame of samples has been received and is ready for transfer to the host processor. As a result, each time a frame of samples is sent to the receiving buffer, an interrupt signal is sent to the host processor. Thus, the processor must constantly receive the interrupts, regardless of whether the host processor is ready to receive samples. This configuration would necessarily burden the host processors with a large number of interrupts to which it must respond. In the event that the processor does not respond, the transferred frames of samples may be partially or fully overwritten with incoming samples from the CODEC and lost. Moreover, since the echo cancellation must be continuous, the lost samples can cause problems when the echo subtraction in the echo cancellation scheme is not kept synchronous with the incoming signal flow. As a result, this configuration requires extensive logic in the HSP in order to account for the lost samples while performing the echo cancellation procedures. Even if it is kept synchronous with the signal flow, this still does not solve the problem of lost samples. If it persists, excessive noise can occur and ultimately failure of a communication link.

Therefore, there exists a need for a new modem configuration that conforms with the V.34 and V.90 recommendations and that better handles samples lost as a result of overflows and underflows occurring in the buffers. As will be seen below, the invention accomplishes this in a simple and elegant manner.

SUMMARY OF THE INVENTION

The invention provides a device for use in a modem configuration that enables the transfer of data from the HSP to the CODEC with less data loss, with low noise and that can send data at varying carrier frequencies without changing the size of the buffers. Furthermore, the invention allows for data transfer that is flexible with any given modulation scheme, carrier frequency or baud frequency to conform with the V.34, V90, as well as prior and subsequent recommendations. The device includes a receive buffer for transferring data from an A/D-D/A converter, such as a CODEC, to a HSP. The invention further includes a counter for counting the number of data samples transferred between the CODEC and the HSP and for alerting the HSP to avoid an overflow condition. The counter is further configured to count beyond the physical size of the buffer in order to simplify operation in an overflow condition.

The invention further includes a transmit buffer for transferring data from the HSP to the CODEC. Communicating with the HSP and the CODEC is another counter that, similar to the first counter, counts the data sent from the HSP to the CODEC. A threshold is established to activate a null signal generator connected to the output of the transmit buffer by a switch to send a null signal to the CODEC when there is no data in the transmit buffer. This helps to maintain the communication link between the CODEC and the data transfer system. Once data is again available in the transmit buffer, the switch resumes communication between the transmit buffer and the CODEC. Furthermore, the transmit buffer is synchronized with the receive buffer to allow seamless echo cancellation procedures to be performed by the HSP. The echo cancellation can now be consistent both during normal operation as well as while the receive buffer is in an overflow condition.

DETAILED DESCRIPTION OF PREFERRED EMBODIMENTS

The invention is directed to an interface for providing effective transfer of data between a host signal processor (HSP) and a CODEC. The invention is particularly adapted to interfaces for use in personal computers and will be described in that context. It will be appreciated, however, that this is illustrative of only one utility of the invention, and that the invention has greater applicability and utility.

Briefly, the invention provides an interface configured to transfer data between an A/D-D/A converter, such as a CODEC, and a HSP in conformance with the V.34 recommendation as well as prior and subsequent recommendations. A receive buffer is connected between the CODEC and the HSP for receiving data from the CODEC and for transferring data to the HSP when the HSP is ready to receive data. The receive buffer can be a first in-first out (FIFO) configuration where data enters in one end of the buffer and exits out the other end. Unlike the prior art configuration discussed above, there are no fixed portions of the buffer portioned out to fit a certain frame size. Instead, data enters the buffer at one end and exits at the other, regardless of the size of the data transfer. This provides the advantage of enabling data transmission with less data loss, with low noise and that can send data at varying carrier frequencies without changing the size of the buffers. Furthermore, the invention allows for data transfer that is flexible with any given modulation scheme, carrier frequency or baud frequency to conform with the V.34, V90 as well as prior and subsequent recommendations.

The invention further includes a counter circuit that communicates with both the CODEC and the HSP in order to count the number of data samples received from the CODEC and stored in the receive buffer as well as the number of data samples read from the receive buffer by the HSP. Utilizing the counter information of the invention, the HSP can now track the number of data samples transferred and account for any data loss in the echo cancellation routine that may have occurred during an overflow condition.

In operation, the counter begins at a reference point and increments when a sample is received by the receive buffer from the CODEC and decrements when a sample is read from the receive buffer by the HSP. A threshold is established based on the maximum number of samples that the HSP can handle at one time, among other factors, so that, when the counter reaches the threshold, an interrupt will be sent to the HSP to indicate that data is ready. In response, the HSP can retrieve data and avoid the overflow condition. As an added feature, interrupts can be limited in number by only sending one when the buffer count is greater than or less than the threshold and only after a prior interrupt has been acknowledged by the HSP. This limits the number of interrupts sent to the HSP.

The invention further includes a transmit buffer for transferring data from the HSP to the CODEC. Communicating with the HSP and the CODEC is a second counter that, similar to the first counter, increments when data is received from the HSP into the transmit buffer and decrements when data is transferred from the transmit buffer to the CODEC.

A second threshold is established based on an underflow condition, a condition where the transmit buffer contains no data to be transferred. Once this threshold is reached, a null signal generator, connected to the output of the transmit buffer with a switch, sends a null signal to the CODEC in order to maintain the communication link between the CODEC and the data transfer system. When data is once again available in the transmit buffer, the switch resumes communication between the transmit buffer and the CODEC. This is an improvement over the prior art configuration discussed above, which recycles and resends old data from the transmit buffer in an attempt to maintain the data link. Utilizing the invention, the system now sends a null signal that, among other advantages, requires less power.

The two counters are synchronized in normal operation, such that the number of received samples available for the host is equal to the number of spaces available for new transmit samples in the buffer. This synchronization is achieved if the CODEC always transmits one sample for every receive sample, and the host transfers one transmit sample every time it reads one received sample. The host can also transfer groups of multiple samples, but the total receive samples must equal the total transmit samples. The counters also have ranges which are greater than the physical length of the buffers. This is an improvement over the prior art systems, because it allows the signal processing functions, including echo cancellation, to operate smoothly in the case of buffer overflow. The second threshold used in the second counter can simply be zero, implying that there are no valid samples in the transmit buffer to be transmitted. For simplicity of design and operation, the two buffer counters can also be combined in a single counter to perform all of the functions of the two counters, serving both the receive and transmit buffers.

Figure 1A:
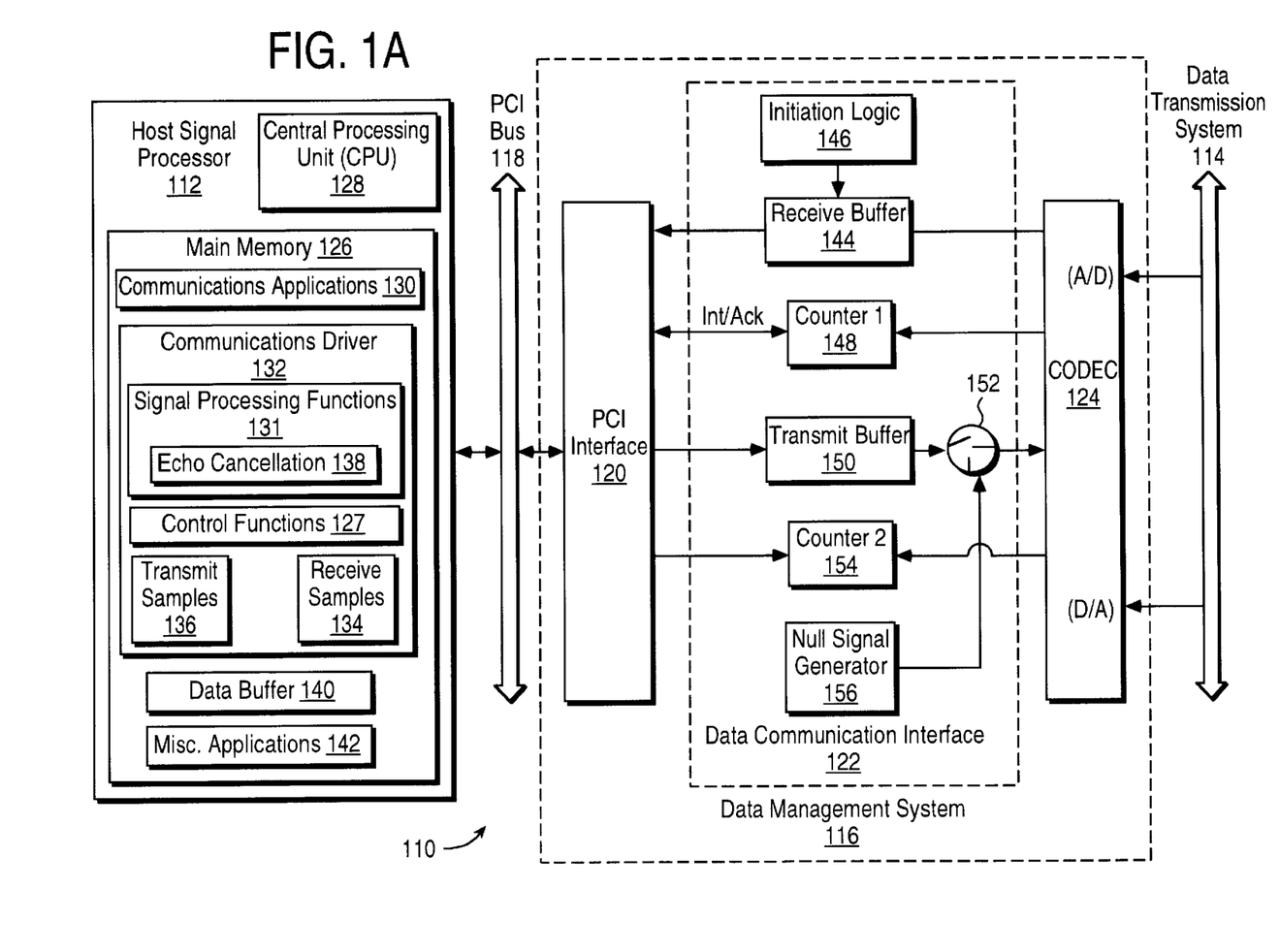
FIG. 1A is diagrammatic view of a computer system having an interface in accordance with one embodiment of the invention.

Now referring to FIG. 1A, computer system 110 is shown having a host signal processor (HSP) 112 communicating with a data transmission system 114 via data management system 116. HSP 112 is connected to peripheral component interface (PCI) bus 118, which connects the HSP to various peripheral components including data management system 116. Data management system 116 includes PCI interface 120 that communicates on the PCI bus 118 using a PCI standard protocol for transmitting data on the PCI bus. Such a protocol is standard in the industry and well known to those skilled in the art. The PCI interface 120 communicates with the data communication interface 122 to receive and send data from the data transmission system 114. A signal converter also known as a CODEC 124 receives analog signals from the data transmission system 114 and converts them to digital data signals that are recognizable by the data communication interface 122 for ultimate transfer to the HSP 112. The CODEC 124 also converts digital data signals received from a data communication interface 122 to analog signals that are recognizable by the data transmission system 114. Data transmission system 114 is a system that transfers data in the form of analog signals and can include a conventional telephone system that is commonly used by data management systems such as the invention.

The following is a description of data management system 116 in accordance with one embodiment of the invention that functions with HSP modem software as a modem to connect HSP 112 to data transmission system 114. As discussed above, the modem modem is no longer a single unit that performs all modem functions. The control functions of the modem are now done by the HSP 112 and the data transfer operations are performed in data communications interface 122, which acts to connect HSP 112 to data transmission system 114.

HSP 112 includes a main memory 126 that is controlled by a central processing unit (CPU) 128 to perform data transfer and data processing functions, among other functions. Main memory 126 includes communications applications 130 to perform functions including but not limited to file transfer, Web browsing, and E-mail access. Communications applications 130 may also include applications to implement networking protocols such as Point to Point Protocol (PPP), which is well known to those skilled in the art. Communications driver 132 includes software programs to receive samples 134, transmit samples 136 and perform signal processing functions 131 and control functions 127 including echo cancellation 138. Main memory 126 further includes data buffer 140 and miscellaneous applications 142, which share the central processing unit 128, main memory 126, and other resources of HSP 112.

Still referring to FIG. 1A, data communication interface 122 includes a receive buffer 144 that communicates with the CODEC 124 to receive data from the data transmission system 114 as converted to digital signals by the CODEC 124. Receive buffer 144 further communicates with the PCI interface 120 to send data at the request of the HSP 112. Data communication interface 122 further includes initiation logic 146, communicating with the receive buffer 144 and configured to perform logic operations to initiate communication between the CODEC 124 and receive buffer 144. The HSP 112 initializes both the receive and transmit buffers 144,150 using a control register (not shown).

First counter 148 communicates between the CODEC 124 and PCI interface 120, and ultimately to HSP 112, to keep track of data transferred in and out of the receive buffer 144. In operation, the initial state is such that the receive counter 148 is set to the physical size of the buffer 144, and the transmit counter 154 is set to zero. In this state, the receive buffer 144 is "full" and the transmit buffer 150 is "empty." The initiation logic 146 is used to reset the state of the interface buffers 144,150. In its initial state, the receive buffer 144 is full of "null" samples, which represent an analog waveform having no energy. By reading the first counter 148, the HSP 112 is notified that the receive buffer 144 is full of null samples to be transferred and that the transmit buffer 150 has space for up to a full buffer of samples. This will be discussed in further detail below.

Data communication interface 122 further includes a transmit buffer 150 that communicates with the PCI interface 120 to receive data from the HSP 112. Transmit buffer 150 also communicates with data switch 152 and transfers data stored in the transmit buffer 150 to CODEC 124 when the switch 152 is in the position connecting the two, where it is converted from a digital data signal to an analog data signal for transmission to the data transmission system 114. The data is then transferred to a destination which can be another HSP connected to a similar data management system or any other device that can use the data. Data communication interface 122 can further include a second counter 154 that communicates with the PCI interface 120 and CODEC 124 to track data received by and transferred from the transmit buffer 150. The second counter 154 is further connected to null signal generator 156, which is further connected to switch 152. The switch 152 is configured to alternately connect the transmit buffer 150 with the CODEC 124 or the null signal generator 156 with the CODEC 124.

Figure 3:
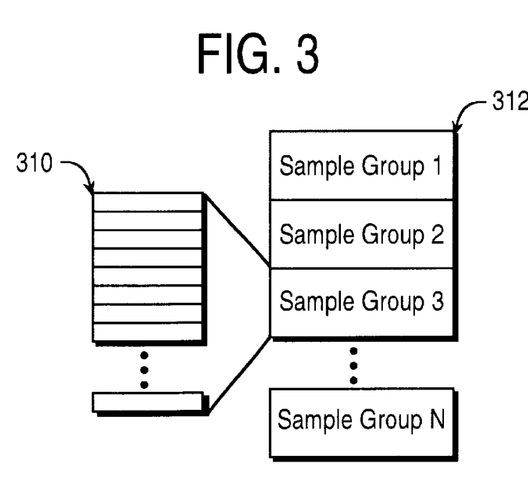
FIG. 3 is a diagrammatic view illustrating the breakdown of data that flows through the interface of FIGS. 1 and 2.

Still referring to FIG. 1A, in operation, data is received from a data transmission system 114 by the CODEC 124 and converted from an analog signal to a digital data signal. At the beginning of the communication connection, the initiation logic 146 initiates the receive buffer 144 to receive the digital data signal and store it in the form of digital data in the receive buffer 144. Referring to FIG. 3, a diagrammatic view of data flow is shown to illustrate how the data is transferred and categorized. Data is transferred in a serial manner and grouped into samples 310, which can be of any length, such as 16 bits of digital data. Referring again to FIG. 1A, this stream of data samples 310 enters one end of the receive buffer 144 in a first-in/first-out (FIFO) manner, with the data exiting another end of the receive buffer 144. The data is then transferred to the PCI interface 120 and, ultimately, to the host signal processor 112. Typically, the host signal processor 112 transfers data in groups of samples 312.

Figure 4:
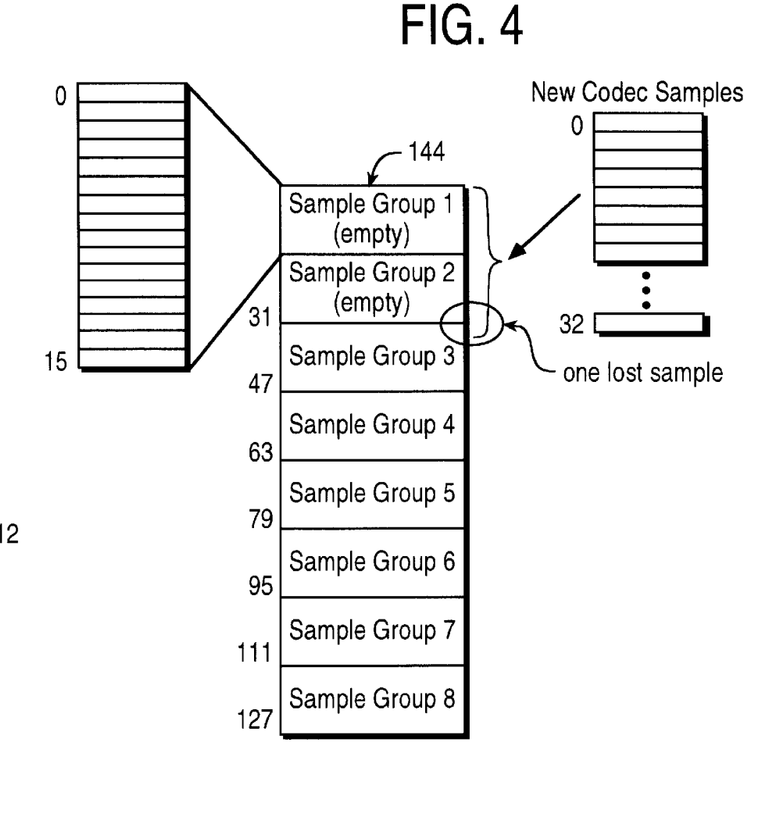
FIG. 4 is a diagrammatic view of a sample data transfer in accordance with the invention.
Figure 5:
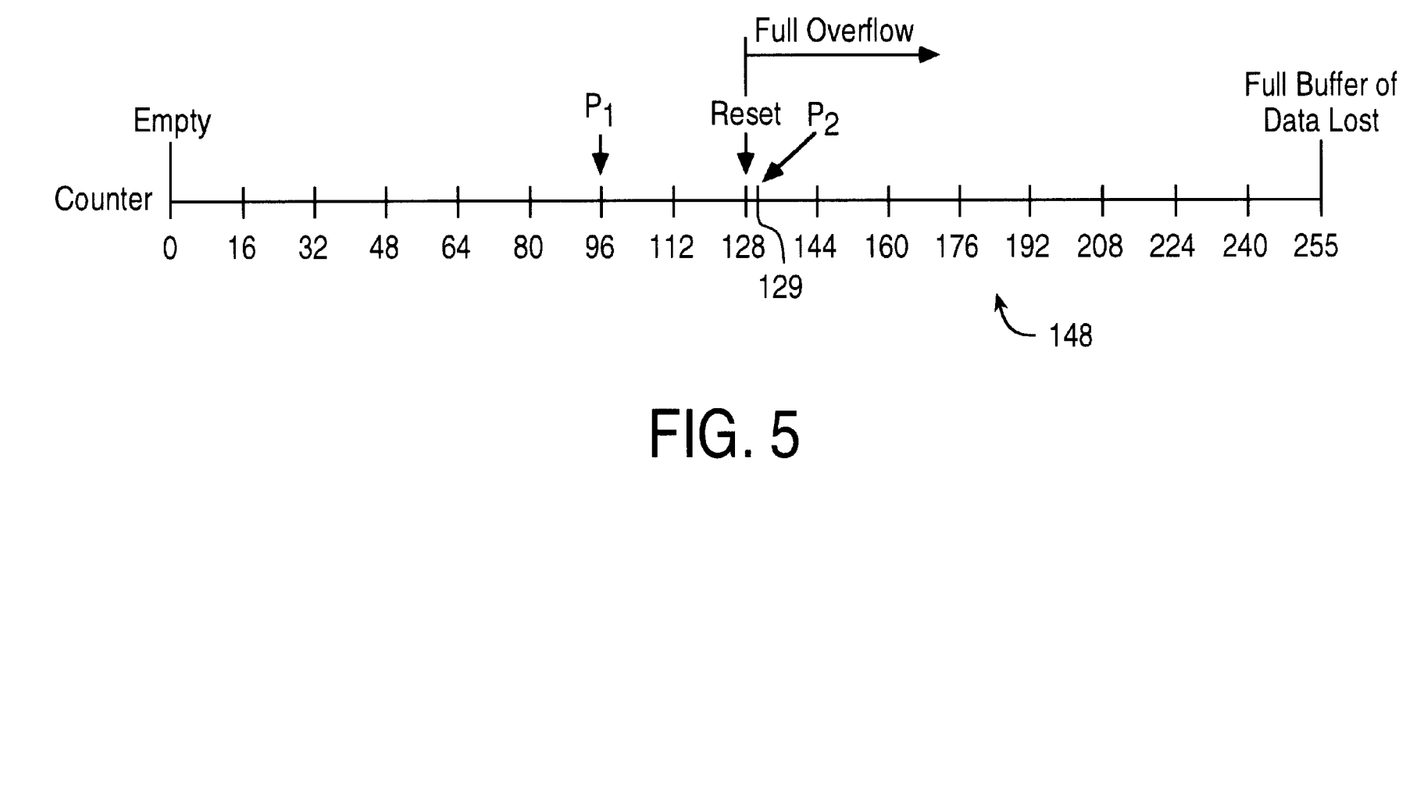
FIG. 5 is a diagrammatic view of a counter in accordance with the invention.

Referring to FIGS. 4 and 5, the storage operation in the receive buffer 144 is illustrated in more detail. The sizes and lengths of the buffers described below and illustrated in FIG. 4 and 5 are for illustration only. Other buffer sizes can be used in accordance with the invention. For proper handling of overflow conditions, the counter must have a range greater than the length of the buffers. This allows the counter to track the number of samples lost as well as those transferred, so the echo cancellation procedures can operate seamlessly in the case of buffer overflow.

A threshold is programmed for the counter by a designer and may be based on a number of factors. The threshold may also be different for different communication standards, and for different points in the procedures described by the communication standards. One factor is the minimum number of samples that the HSP is configured to handle at one time, which should be taken into account to realistically predict the amount of data to be transferred to the HSP so that interrupts will not occur too frequently. If this number is too small, for example, the HSP will be overloaded with more interrupts in which it can effectively respond. This is an improvement over the prior art systems that interrupt the HSP whenever data is available, overloading the HSP with interrupt signals. According to one embodiment of the invention, the HSP is burdened with only one interrupt at a time until it responds or acknowledges the interrupt, thereafter, allowing for another interrupt to be sent.

The length of the buffer and the threshold can be designed to balance certain competing parameters such as the delay incurred from the data passing through the buffer, the probability of buffer overflow and the frequency of interrupts. If the threshold is set properly, the HSP can have a latency of several samples before it must respond to the interrupt. The buffer is then less likely to overflow.

In FIG. 4, a diagrammatic view of data transfer in the receive buffer 144 is illustrated in accordance with the invention. In FIG. 5, diagrammatic view of the counter 148 and respective locations of the counter's pointer in a relation to different data transfers into the buffer is illustrated. FIG. 4 further illustrates a buffer 144 having 128 locations for storing 128 samples of data, where two transfers of sixteen samples each occur to a buffer sized to hold 128 samples. The samples stored in the buffer 144 of FIG. 4 illustrate data samples stored in locations 32–127. These represent the locations immediately following two groups of samples transferred out of the buffer while none are received, leaving room for the CODEC to transfer 32 more samples to empty locations 0–31.

Referring to FIG. 5, with reference to FIG. 1, upon the initiation of the receive buffer 144 by initiation logic 146, the counter is reset to 128. Each time a sample is received, the counter is incremented by one. When data is transferred from the receive buffer 144, the counter is decremented according to the number of samples that are transferred from the buffer. As illustrated in the counter grid, the counter is configured to count down to 0 and up to 255. If the pointer were reduced down to 0, this would indicate that the buffer is empty, or, in other words, 128 samples of data were transferred from the buffer and none were received from the CODEC 124. If the pointer was located at position 128, this would indicate that the buffer is full, or, in other words, that 128 samples of data were transferred to the buffer from the CODEC and none were transferred to the PCI interface 120. Location $P_1$ indicates that two groups of 16 samples each were transferred. Unless data is read, the data will begin to be overwritten in the buffer by incoming data. Location $P_2$, occurring subsequent in time to position $P_1$, indicates that a total of 33 samples were received by the buffer and none were transferred to the PCI interface 120.

Referring again to FIG. 4, a situation is illustrated where 96 samples of data are stored in positions 32–127 and 33 samples are transferred from the CODEC to the buffer. This is an overflow condition since one sample was transferred after the buffer was full at 128 samples. In this example, the receive buffer 144 is initially at a full condition. This could be due to either initialization of the data communication interface 122 by the HSP 112, or latency in responding to an interrupt. Once the HSP 112 responds to the interrupt from the counter 154 and transfers 32 samples from positions 0–31, the counter 154 is moved to position P1 as shown in FIG. 5. The counter 154 is reduced to 96, and positions 32–127 (FIG. 4) have valid samples. Assuming the HSP 112 stops transferring samples and acknowledges the interrupt at this point, another interrupt will be generated if the threshold is set lower than 96. In this example (FIG. 4), the HSP 112 is busy, so before it has a chance to respond, 33 samples are transferred from the CODEC 124. Now the counter 154 is at 129, indicating that one sample has been overwritten. When the HSP 112 begins to respond to interrupts again, it will read an invalid sample where the new sample has overwritten an old one. The last sample from the CODEC overwrites position 32, which is the first sample in Sample Group 3, which has not yet been processed by the HSP. This will cause some noise in the signal received by the HSP 112. In this example, the counter 154 ranges from 0–255, so it can indicate up to 127 lost samples.

The counter 154 has a range that is greater than the size of the physical buffer 144, adding greater flexibility to the buffer 144 over the prior art. The counter 154 capacity defines the limits of the virtual size of the buffer 144. This does not mean that data can fill the buffer 144 beyond its physical limits, but the counter 154 keeps track of the number of samples transferred in and out of the buffer 144, so that the delay seen by the echo cancellation procedures is consistent. The counter 154 is limited in practice to a finite size and therefore has a maximum value. A mechanism is needed to handle an overflow of the counter 154. One such mechanism would allow the counter 154 to wrap around to its minimum value when it is incremented from its maximum value. This could cause the situation where the HSP 112 responds to an interrupt, but finds that the counter 154 indicates a value less than the threshold. To prevent this, a sticky bit can be used to handle counter overflow. In this configuration, the most significant bit of the counter is a sticky bit. Thus, once it becomes logic one, it can only become zero again through a decrement. That way, if an increment is done to the counter 154 when it is at its maximum value, the next value will be half the maximum value instead of the minimum value. For example, if an 8 bit counter is used and is incremented from a value of 255, the next value would be 128 instead of 0.

Figure 1B:
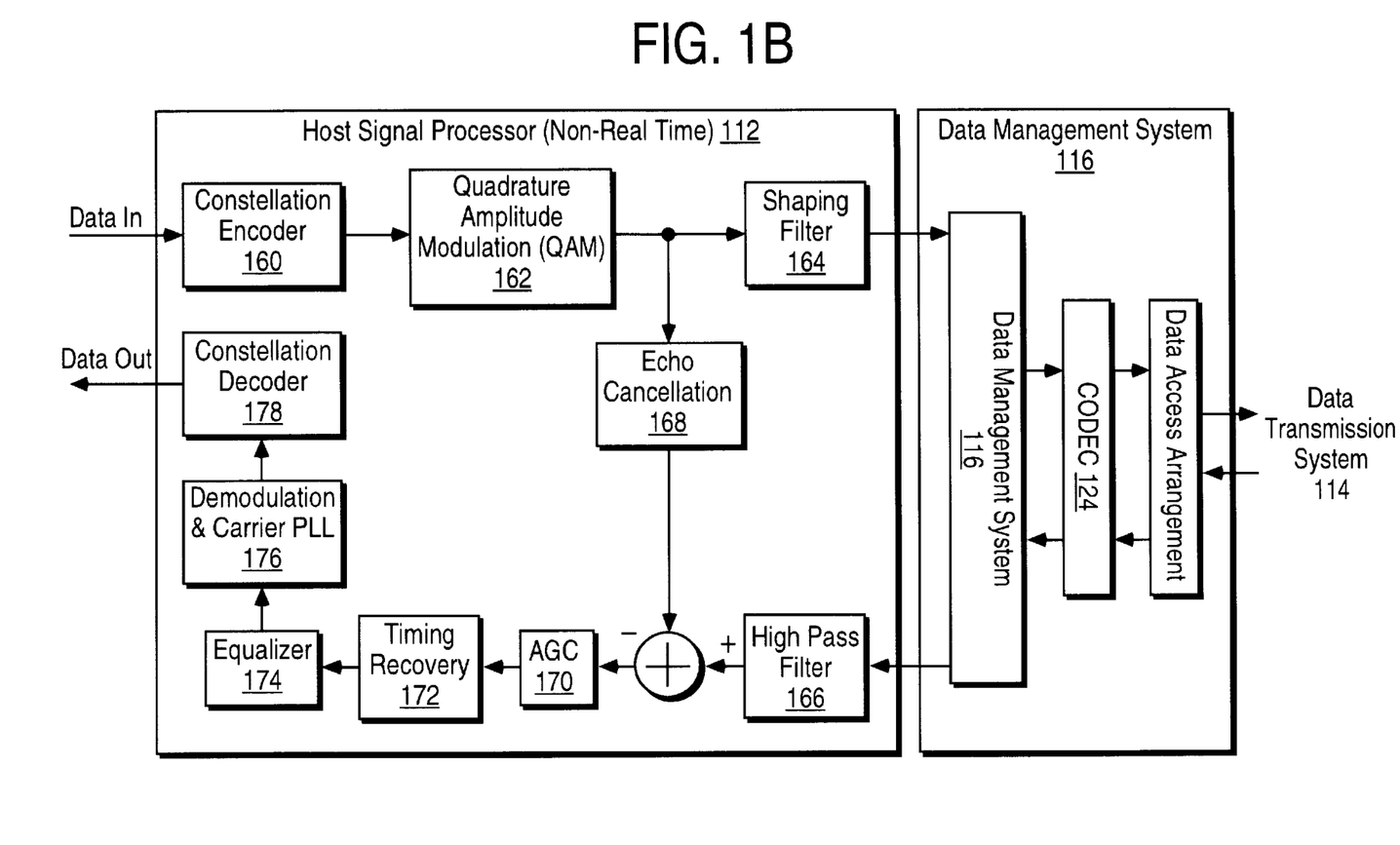
FIG. 1B is a diagrammatic view of an HSP based modem according to the invention.

Referring now to FIG. 1B, a block diagram of a HSP based modem in the context of Quadrature Amplitude Modulation (QAM) will now be described. QAM is a method that changes the phase and amplitude of a carrier signal at a fixed rate. In one embodiment, the function blocks shown in the HSP 112 are performed by the communications driver 132 of FIG. 1A. Data from the modem controller is mapped onto two dimensional constellation points 160 using encoding methods described by a communications standard, such as V.22, V.22bis, V.32, V.32bis, or V.34. These points, $A_i + j^* B_i$, where j is defined as the imaginary number equal to the square root of −1, are multiplied by a complex carrier $e^{jw}$. The real number portion of the result is used. The real number portion of the result represents a digital waveform, which is passed through a shaping filter 164, then sent to the data management System 116 to be converted to an analog waveform and transmitted on the data transmission system 114.

Incoming samples from the interface hardware are passed through a high-pass filter 166 to remove DC components. For communication standards where the transmit and receive directions use overlapping frequency bands, such as V.32, V.32bis, and V.34, an echo-canceller 168 subtracts from this signal a filtered and delayed version of the output of the QAM 162 in the transmitter. The filter and delay parameters are typically set in the HSP 112 during the startup procedures of the communication standard. Next, an automatic gain control (AGC) 170 applies a gain such that the signal power is normalized to a preset level, regardless of the attenuation of the signal of the data transmission system 114. Next, a timing recovery procedure 172 synchronizes to the symbol rate of the remote source of the data transmission (the remote transmitter) symbol rate. An equalizer filter 174 is then applied to remove the effects of inter-symbol interference (ISI). The equalizer operates on both the in-phase and quadrature portions of the signal, and outputs a two-dimensional complex signal, which can be demodulated by a demodulation and complex carrier phase locked loop (PLL) 176. A phase locked loop is used to ensure that the receiver's carrier is synchronized to the remote transmitter's carrier signal. Finally, the complex output of the demodulator is decoded by the Constellation Decoder 178 into information bits using the appropriate methods from the communication standard, and passed to the control functions 127 for further processing and decoding 127.

Under the V.90 recommendation, one direction, upstream (or client to server) uses QAM, and the other direction (downstream, or server to client) uses Pulse Coded Modulation (PCM). The configuration for a V.90 client is very similar to the QAM block 162 of FIG. 1B, except that there is no Demodulation and Carrier PLL block 176, since there is no downstream carrier signal. In this case, the equalizer 174 is one dimensional and its output is real. V.90 servers, on the other hand, are different since they do not use QAM techniques in the transmitter and they do not employ a CODEC.

An overflow condition as disclosed above occurs when the host computer fails to service the interface buffer 116 in time. The result is that some of the samples in the receive buffer 144 are lost, and some null samples are transmitted to the CODEC 124. However, the host continues to process samples normally, and the signal flow is the same as described above. The result is that some of the samples transferred to the high-pass filter 166 are not representative of the analog signal being received from the data transfer system. And the signal used for echo-cancellation is not exactly that which was actually transmitted since it does not account for the null samples. However, the echo delay remains the same, so that HSP processes, including echo cancellation, continue to function smoothly in the case of an overflow. The effects of lost samples can be analyzed as "impulse noise", or noise having high power for a very short duration. Impulse noise can have many effects, depending on severity. For example, it can cause error in the data that is transmitted to the controller. Usually an error-correcting standard, such as V.42, is incorporated in the overall design, so this effect will be mitigated. Impulse noise may also cause one of the modems to initiate rate renegotiation or retrain procedures. Rate renegotiation procedures are typically fairly quick, less than one second, and may be unnoticeable by the communication application in many cases. Full retraining of the system may take several seconds, and is more noticeable. The overall system incorporating the invention is designed so that overflow happens infrequently. Therefore, retraining due to overflow rarely occurs.

The counter 148 is preprogrammed with a threshold which, when reached, initiates an interrupt to be sent to the HSP 112 indicating that an overflow condition is imminent. In order to avoid losing data, the threshold can be set at a counter location equal to or less than 128 (FIG. 5) so that the HSP can retrieve data prior to an overflow condition. In order to avoid a large amount of interrupts sent to the HSP 112, the counter 148 can be configured to send interrupts one at a time and only after a prior interrupt has been acknowledged by the HSP 112. This feature is unlike conventional interfaces, which send interrupts each time data is received by a receive buffer. In such a conventional configuration, the HSP 112 is constantly interrupted when data is available. In another embodiment of the invention, there is no interrupt, but the HSP 112 periodically reads the counter 148 to determine whether there is enough data available to process.

For example, referring again to FIG. 4, if the threshold of the counter 148 is set to a number less than 96, an interrupt would be sent to the HSP 112 before the 33 samples are received in the buffer. At this time, if possible, the HSP 112 can read data from the buffer, making room for all 33 samples in the buffer and avoiding an overflow condition and preventing the loss of any samples.

The transmit buffer 150 receives and sends data in a similar manner as the receive buffer 144. Data is received in the transmit buffer 150 in a first-in, first-out (FIFO) manner so that data is received in a serial manner at one end and transferred out in a serial manner at another end. The second counter 154 keeps track of data entering and leaving transmit buffer 150 in the same manner as the first counter 148 operates. The second counter is synchronous with the first counter to ensure that both buffers operate at the same sample rate. The condition that is problematic for the transmit buffer is an underflow condition, which happens at the same time the receive buffer 144 experiences an overflow condition. Underflow means that the CODEC needs new samples for conversion, but none are available in the transmit buffer 150.

The CODEC typically uses a single sampling rate for both A/D and D/A conversion. Therefore, data is transferred from the receive buffer to the PCI interface at the same rate as data is transferred from a PCI interface to the transmit buffer 150, with a slight latency in time. Thus, the HSP must keep the number of samples sent to the transmit buffer 150, which is equal to the number of samples read from the receive buffer. So long as data is available in the transmit buffer 150, the switch 152 connects the output of the transmit buffer 150 to the CODEC 124 so that data can be transferred. However, in the event of an underflow, when new data is not available in a transmit buffer, the switch 152 connects to null signal generator 156 to send a null signal to the CODEC 124. The null signal is then converted to an analog null signal sent to the data transmission system 114. This is in contrast to the conventional modem described above, in which the CODEC 124 converts old samples that are leftover in the transmit buffer from prior transfers. Neither method will suffice to keep a reliable communication link active for long, so the system must be designed to minimize the occurrence of overflow/underflow conditions.

Figure 2:
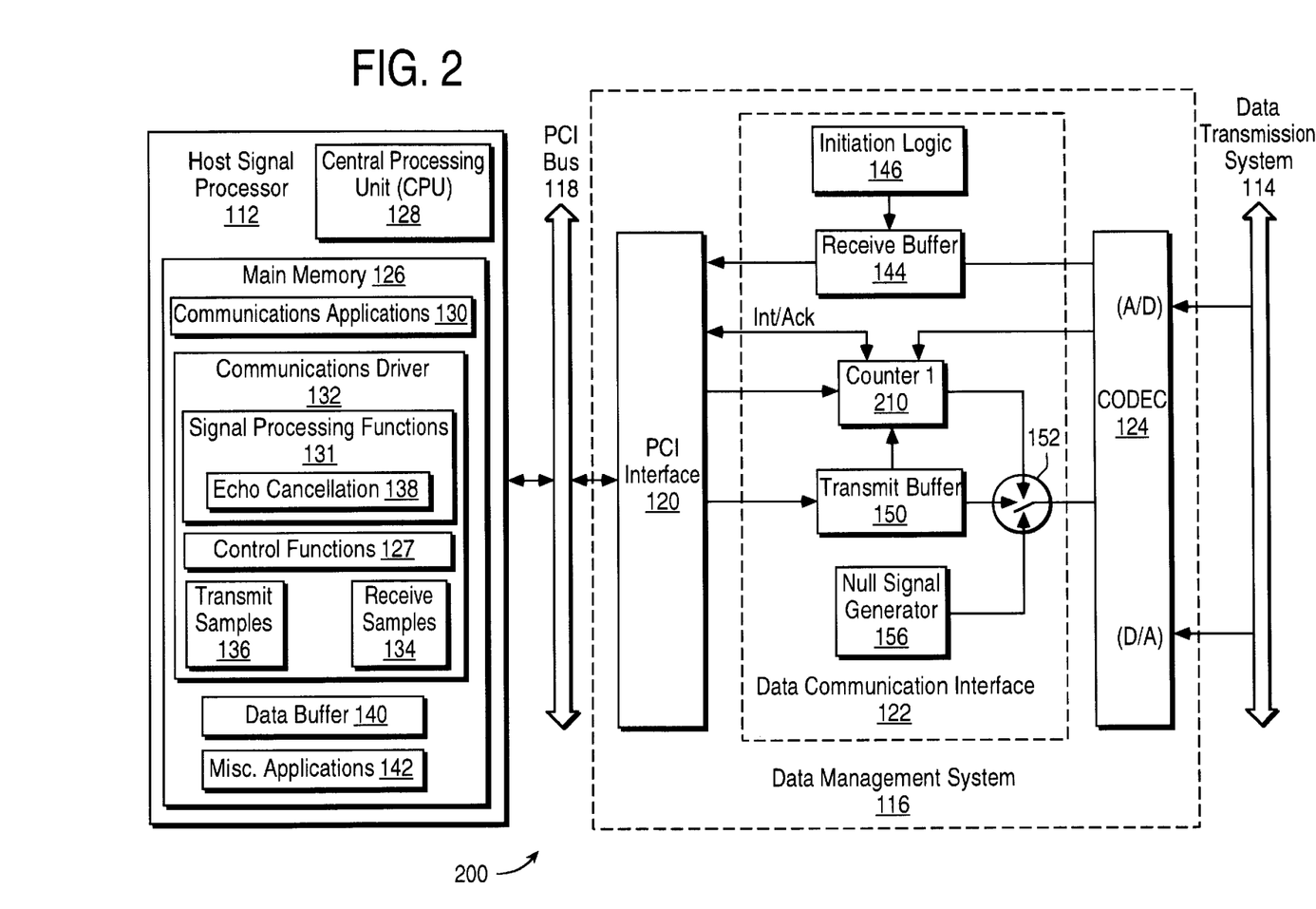
FIG. 2 is a computer system having an interface in accordance with a second embodiment of the invention.

Referring now to FIG. 2, a second embodiment of the invention is illustrated having a single counter circuit. The receive buffer 144 and transmit buffer 150 operate in the same manner as the configuration illustrated in FIG. 1. The switch 152 also operates in the same manner. The new counter 210, however, is configured to perform the functions of the first and second counters 148, 154 in FIG. 1. The counter 210 receives data from the PCI interface 120 and CODEC 124 to keep track of data that is received by and sent from each of the buffers 144, 150. Conceptually, the size of the counter has a dual meaning: both the number of receive samples available for processing by the HSP 112, and the number of spaces available to store transmit samples from the HSP 112. In practice, the counter 210 may be connected to only one of the buffers. In this case, if the transmit and receive transfers do not occur simultaneously, then the counter 210 has its dual meaning only after both transfers are complete. The counter 210 is further connected to switch 152 to connect the transmit buffer 150 to the CODEC 124 when data is available in the transmit buffer 150 to be transferred to the CODEC 124. The counter 210 is further configured to connect the null signal generator 156 to CODEC 124 when data is not available, sending a null signal to the data transmission system 114.

Figure 6A:
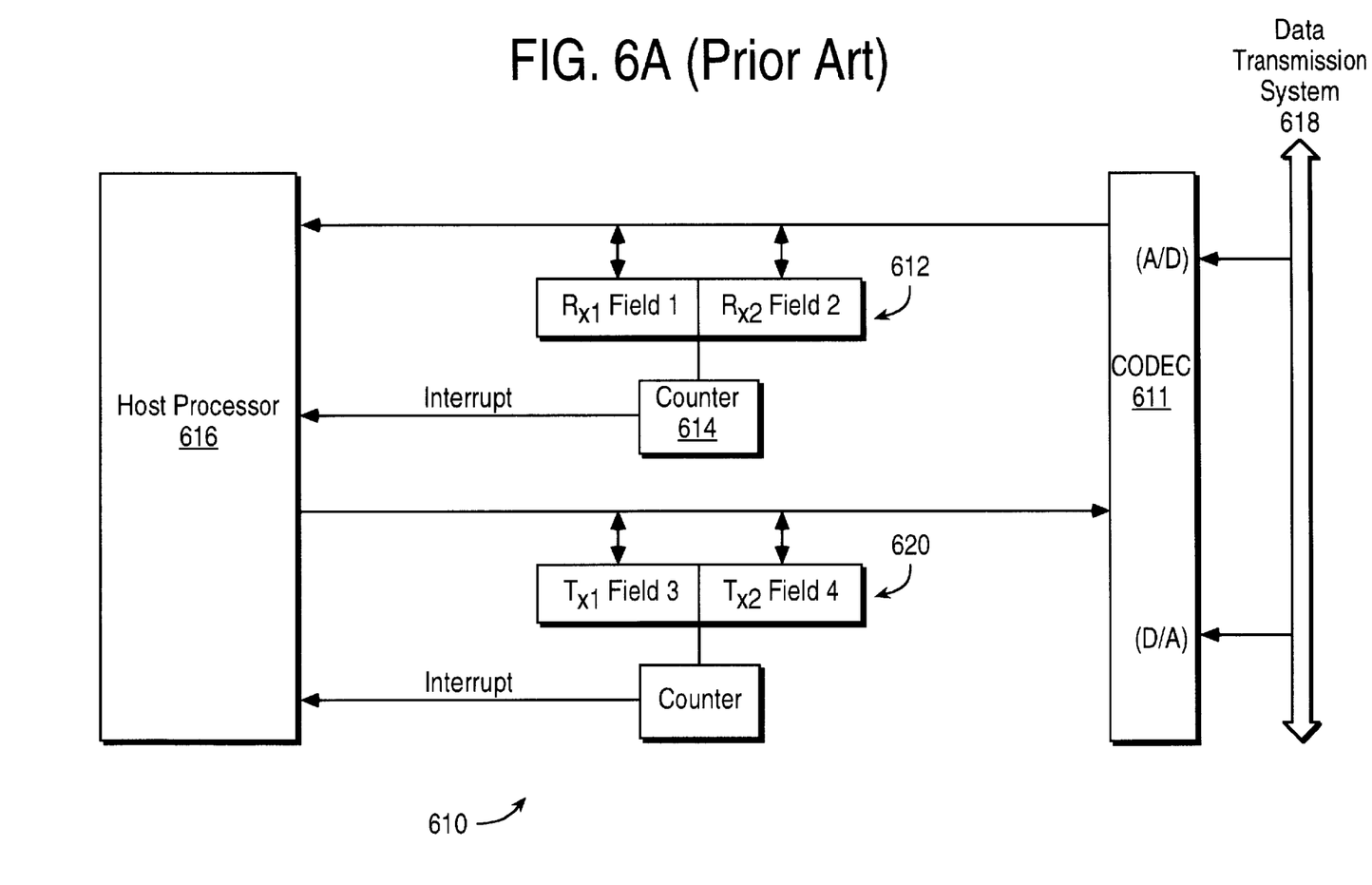
FIG. 6A is a diagrammatic view of a conventional interface in accordance with the prior art.

Referring now to FIG. 6A, a diagrammatic view of a conventional circuit of a prior art configuration is illustrated for contrast. Circuit 610 includes a first receiving buffer 612 that is divided up into predetermined fields of predetermined lengths. A counter 614 is connected to the buffer 612 and is configured to send interrupts to the host processor 616 each time a field of data is transferred to the buffer 612. In operation, the CODEC 611 receives an analog signal, converts it to a digital data signal and transfers it to the buffer 612 in one of the two fields in which the buffer 612 is divided. The counter 614, recognizing that predefined number of sample periods has passed, sends an interrupt to the host processor 616 indicating that data is available.

The host processor 616 can then retrieve data from the address at which it was left. Unlike the invention, the buffer 612 of this conventional configuration receives and transfers data in field blocks, sending and replacing fields of data. In the event of an overflow, an entire field of data can be lost when the host processor 616 is unable to retrieve the data. The data transfer system 618 must keep a communication link, having a continuous signal going from the CODEC 611, to the receive buffer 612, to the host processor 616, through the transmit buffer 620, back through the CODEC 611 and ultimately back to the data transfer system 618. If data is transferred to the receive buffer 612 and host processor 616 is unable to receive data, the data subsequently transferred from the CODEC will overwrite an entire field of data. This illustrates one advantage of the invention in which only an absolute minimum amount of data is lost as a result of an overflow condition. Secondly, another aspect of the invention that is superior to this conventional configuration is the overflow handling counter circuit. The counter circuit of the prior art only serves to count sample periods, in order to generate periodic interrupts. The counter circuit of the above-described embodiments of the invention keeps track of the exact number of samples available and, due to its extended range, can account for lost samples due to overflow. In this prior art configuration, separate overflow and underflow circuits are needed, along with counters to keep track of the number of frames lost, so the HSP knows which of the two buffer partitions to use. In contrast, the invention has a much more simplified circuit.

In further accordance with the invention, another feature can be included wherein the interrupt rate can be made dynamic, based on the ability of the HSP 112 to respond. A nominal interrupt rate is established by setting the threshold to the minimum number of samples that the HSP 112 can handle at one time. As long as the HSP 112 can respond quickly enough, it will transfer samples and acknowledge the interrupt before the next minimum number of samples is available. However, if the HSP 112 takes twice as long to respond for example, it will find that the counter indicates that two groups of samples are ready for processing. The HSP 112 can transfer both groups of samples for processing, so the next interrupt will not occur until another group of samples is available. If the HSP 112 continues in this manner, interrupts will only occur at half the nominal rate. In general, the rate of interrupts in the above-described embodiments will be dynamically matched to the rate at which the HSP 112 can handle them. This is in sharp contrast to the prior art, where interrupts occur at a fixed periodic rate, which increases the interrupt rate. Furthermore, the loss of data in this conventional configuration is not automatically accounted for for purposes of echo cancellation. If data is lost, it is completely written over and not accounted for by the counter, which only ranges to the length of the field of samples. In this event, complicated logic is needed in the host processor to account for the lost data for purposes of echo cancellation. These complicated algorithms are not required by a circuit employing the invention.

Figure 6B:
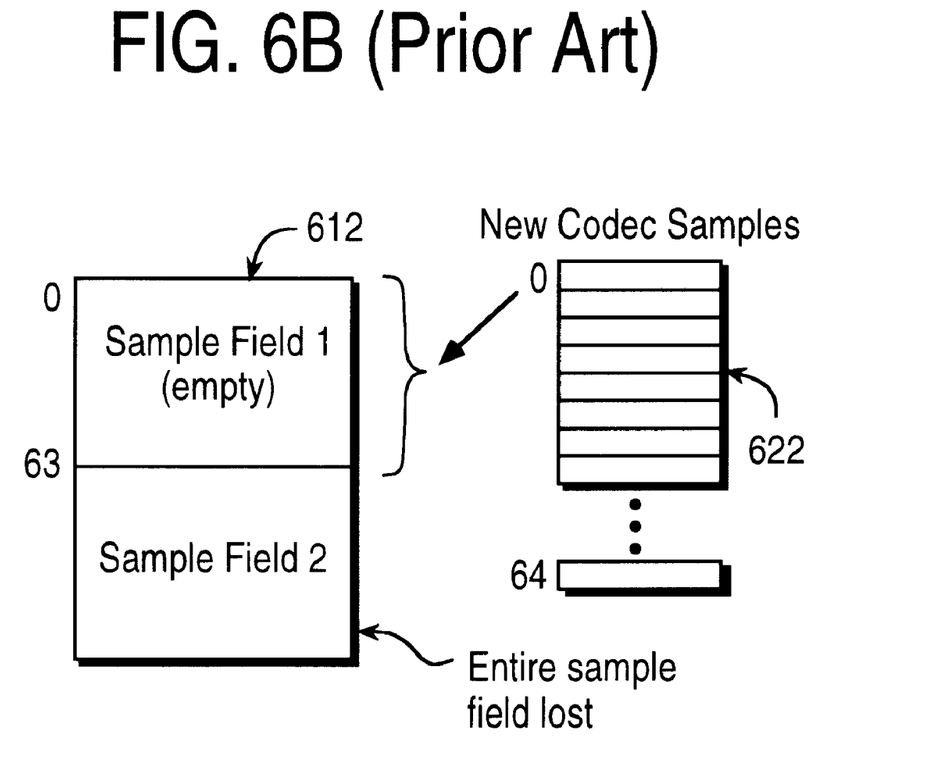
FIG. 6B is a diagrammatic view of a sample data flow flowing through an interface of the prior art.

Referring now to FIG. 6b, a sample data transfer in a circuit of FIG. 6a is illustrated. Samples from the CODEC are put in the buffer 612 in a circular manner. When one field is full, the host processor will be interrupted. If the host fails to respond before it is time to put another sample in that field, the entire field will be lost. For example, if the CODEC has a sample available to be put in location 64 in the diagram, but the host has still not processed the previous data in Field 2, all of that data will be lost and replaced by new samples from the CODEC. In this case, the echo cancellation process would need to account for the lost samples.

Unlike conventional buffer schemes, the invention does not require the echo-canceller to be deactivated, or the buffer to be flushed in the case of buffer overflow. The host, or non-real time part of the system, continues to operate as if nothing happened. The effect is that the echo-canceller buffer (not shown) would contain a signal that was not actually transmitted since a null signal was transmitted when the real signal was not available in time. As a result, the output of the echo cancellation logic, which is to be subtracted from the received signal, is noisy. Therefore, the signal passed to the timing recovery and equalizer blocks will be noisy. The result is a buffer scheme that is easier to implement than the conventional system, without the need for excessive logic to account for loss of samples in the echo cancellation scheme.

The interface includes a flexible buffer system that efficiently transfers data between a host signal processor and a data transfer system, that enables a data processing system to receive data at different carrier frequencies and symbol rates, and that conforms with the V.34 and V.90 recommendations. Although this embodiment is described and illustrated in the context of a modem for a computer system, the scope of the invention extends to other applications where efficient data transfer between real-time and non-real-time systems is useful. Furthermore, while the foregoing description has been with reference to particular embodiments of the invention, it will be appreciated that these are only illustrative of the invention and that changes may be made to those embodiments without departing from the principles of the invention, the scope of which is defined by the appended claims.

What is claimed is:

1. An interface for transferring data from a real-time data transfer system to a signal processing unit comprising:

a circular buffer having an input configured to receive data samples from the real-time data transfer system and to periodically send data samples received from the real-time data transfer system to the signal processing unit when the signal processing unit accepts a transfer, wherein the data is stored and transferred according to a first-in, first-out operational protocol;

a first counter circuit communicating with the signal processing unit and the data transfer system and configured to increment for each data sample sent to the circular buffer from the data transfer system and decrement for each data sample sent to the signal processing unit from the circular buffer, where the counter circuit is configured to count beyond the physical range of the buffer to account for data samples transferred through the circular buffer;

a second circular buffer having an input and an output configured to receive data samples from the signal processing unit and to send data samples to the real-time data transfer system when the data is available;

a second counter circuit communicating with the second circular buffer and configured to increment each time a data sample is received by the second circular buffer from the signal processing unit and decrement each time a data sample is sent from the second circular buffer to the data transfer system, where the counter is configured to count beyond the physical range of the buffer;

a switch communicating with the second counter circuit and the data transfer system; and a null signal generator communicating with the switch for sending a null signal to the data transfer system when a second threshold has been reached.

2. An interface for transferring data between a signal processing unit and a data transfer system comprising:

a buffer circuit configured to transfer data samples between a data transfer system and a signal processing unit in synchronicity, the buffer circuit having at least one input for receiving data samples and at least one output for transmitting data samples, wherein the data samples are transferred according to a first-in, first-out protocol;

at least one counter circuit communicating with the signal processing unit and the data transfer unit to count the number of data samples transferred from each circular buffer, where the counter circuit is configured to count beyond the physical range of the buffers;

an interrupt circuit communicating between the counter circuit and the signal processing unit to transmit an interrupt signal to the data processing unit when the counter reaches a predetermined threshold to indicate that the buffer has a minimum number of samples available for processing;

a null signal generator communicating with the counter; and a switching circuit communicating with the counter circuit, with the data transfer system, with the null signal generator and with a first output of the buffer circuit for alternating communication between the data transfer system and the first output of the buffer circuit and between the data transfer system and the null signal generator to transfer data from the buffer circuit to the data transfer system when data is available and to transfer a null signal from the null signal generator to the data transfer system when data is not available.

* * * * *